Dec. 7, 1926. 1,610,105
H. DE L. MOISE
LIGHT FILTER FOR AUTOMOBILE HEADLIGHT BULBS
Filed Jan. 22, 1924
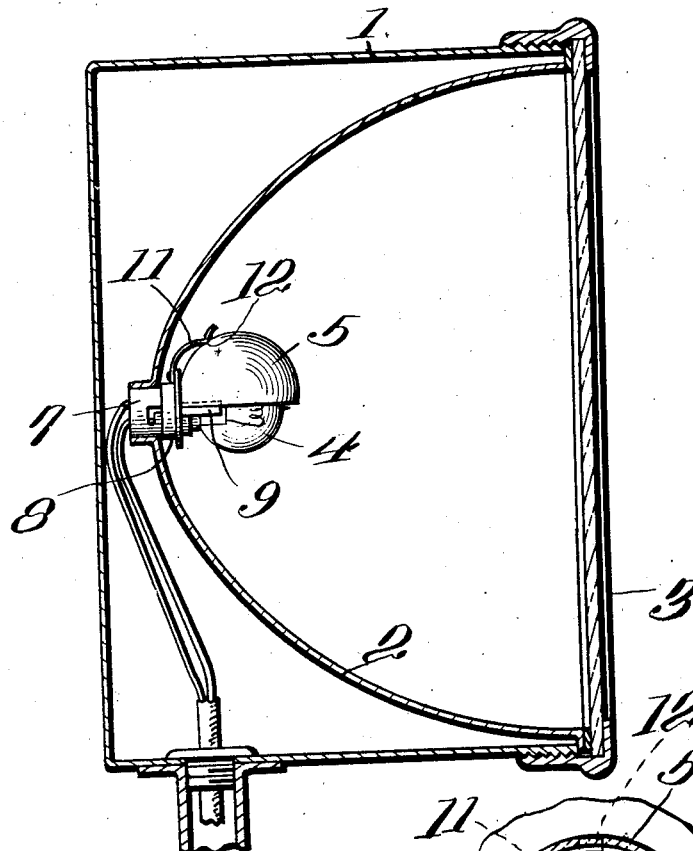
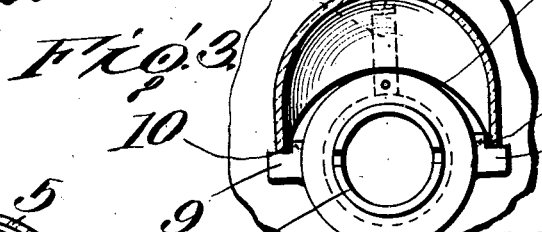
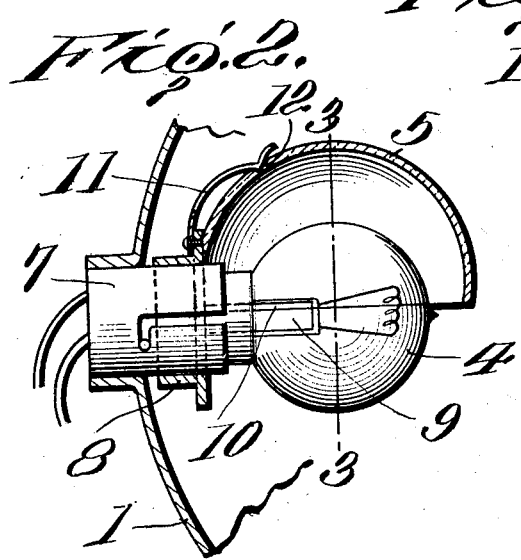
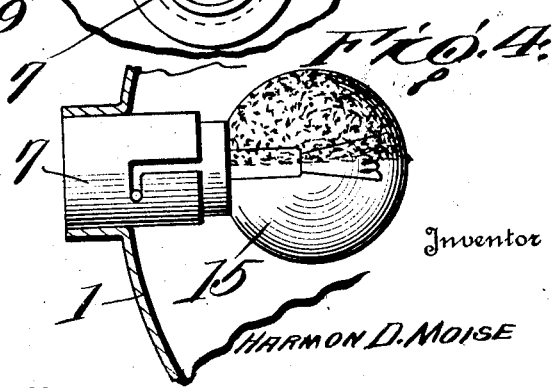
Inventor
Harmon D. Moise
By Sturtevant + Mason Attorneys Patented Dec. 7, 1926.

1,610,105

UNITED STATES PATENT OFFICE.

HARMON DE LEON MOISE, OF SUMTER, SOUTH CAROLINA, ASSIGNOR TO AMERICAN HEADLIGHT DIMMING COMPANY, OF SUMTER, SOUTH CAROLINA, A CORPORATION OF SOUTH CAROLINA.

LIGHT FILTER FOR AUTOMOBILE HEADLIGHT BULBS.

Application filed January 22, 1924. Serial No. 687,742.

This invention relates to anti-glare screens for automobile headlights, and more particularly to a screen adapted to be interposed between the light source and the reflector.

One of the objects of the invention resides in providing a light screening device, interposed in position between the source of light and the reflector, which is characterized by the fact that the screen filters out the actinic rays of the light while permitting the passage and reflection of the remaining light rays, uncolored and unrefracted.

A further feature of this invention resides in disposing such a light screen so that the actinic rays projected forwardly from the headlight above the horizontal vision of an approaching eye are filtered out without discoloration or refraction of the remaining rays while the rays of light projected forwardly below the horizontal are unmodified.

These and other objects will be apparent from a perusal of the following specification when taken in connection with the accompanying drawings, wherein—

Figure 1 is a side sectional view of one form of my invention as applied to a headlight bulb;

Fig. 2 is a side elevational view with the screen shown in section;

Fig. 3 is a front view taken on the line 3—3 of Fig. 2; and

Fig. 4 is a side view of a modified form.

Referring now to the drawings, the usual type of headlight 1 is illustrated to include a reflector 2 and a front glass 3 and the electric bulb 4 positioned in the center of the reflector 2.

Heretofore, it has been proposed to provide screens for the bulb light composed of colored glass or translucent material in order to dampen out the objectionable glare of the light which is projected by the reflector toward the observer in a plane above the horizontal. Such devices are objectionable because they color the light rays passing through to such an extent that considerable of the light is cut off. It has also been proposed to use the screen as a light refracting medium, but these two constructions have not been effective because the light rays have been so distorted as to prevent effective projection forwardly. It has also been proposed to frost the light bulbs in predetermined areas to prevent objectionable rays, but this practice is exceedingly costly and also unsatisfactory, because the frosted zones block off too much of the light.

The present invention resides in utilizing a screen interposed between the source of light and reflector, which screen is composed of a particular kind of glass which filters out the infra red and ultra violet rays of light only and permits passage of the remaining light rays, substantially unabated, uncolored and undistorted. There is a slight diminution of the light, no discoloration, no refraction, nor diffusion. The well known Crooke's glass is an instance of such a light filter.

In the form of the invention illustrated in Figures 1 to 3, inclusive, the light filtering glass is made in the form of a semi-spherical screen 5 provided at its rear with an arcuate cutout 6 to fit rather snugly about the tube 7 forming the socket for the bulb 4. A ring 8 fastens around this tube. This ring is provided with the lateral horns 9 which extend horizontally forwardly on each side of the ring to form a seat for the edge of the screen. These horns are preferably ground as at 10 to provide the retaining shoulders which prevent lateral displacement of the screen. In addition, the rear of the ring is fortified with a leaf spring 11 which bows over the rear of the shell like screen 5 and engages in a notch 12 in the rear of the screen, thereby pressing the screen downwardly and rearwardly against the horns 9 and the rear of the ring 8. By this means, the screen is positioned about the bulb. The screen is arranged in position surrounding the upper portion of the bulb between it and the reflector. In this location, the screen effectively acts on all light rays passing to the upper half of the reflector but does not affect the rays passing to the lower portion. These lower rays are thus projected forwardly by the reflector substantially below the median horizontal plane and are unmodified. The upper rays or those projected forwardly by the reflector above the median horizontal plane are modified by the screen. The screen, because of the peculiar and characteristic composition of the glass or material of which it is composed, filters out only the infra red and ultra violet rays of the light and passes all other rays undiminished in intensity, undiffused, uncolored and unrefracted. By thus eliminating these actinic rays which are the cause of the glare so destructive to the eye and the cause of most accidents, all danger of collision is avoided. At the same time, effective illumination is assured because the brilliancy of the light is not diminished.

In the form of the invention illustrated in Fig. 4, the bulb 15 of the electric light is formed of a lower portion of clear glass, while the upper portion of the glass bulb is formed of the Crooke's glass. By thus making the light bulb of Crooke's glass, the additional screen is eliminated. Obviously, the entire bulb may be Crooke's glass.

It is obvious that minor changes in the details of construction and arrangement of the parts may be made without departing from the spirit of the invention as set forth in the appended claims.

Having thus described the invention, what I claim as new and desire to secure by Letters Patent, is—

1. In a device of the class described, the combination of an automobile headlight, a light bulb supported thereby, a ring supported by said bulb, said ring having lateral horns projecting forwardly thereof, and a spring attached to said ring and bowing forwardly over a portion of said bulb, and a screen adapted to be supported on said horns and formed with a notch into which a portion of said spring projects whereby to hold said screen in position.

2. In a device of the class described, the combination of an automobile headlight, a light bulb supported thereby, a ring supported by said bulb, a screen of hollow substantially hemispherical shape and having a notch in its upper surface rearwardly of its central vertical transverse plane, said ring having a pair of lateral forwardly directed horns thereon to receive the bottom edge of said screen, and a finger attached to said ring and extending forwardly in conformity with the contour of said screen and received at its forward end in the said notch, whereby said screen is held in position over said bulb by said ring and its associated parts without any of said parts interfering with the forward projection of light from said bulb, and whereby said screen may be removed without dismantling said bulb from its support.

In testimony whereof, I affix my signature.

HARMON DE LEON MOISE.